(12) United States Patent
Chouly

(10) Patent No.: US 9,369,707 B2
(45) Date of Patent: Jun. 14, 2016

(54) GLOBAL MOTION VECTOR ESTIMATION

(75) Inventor: Antoine Chouly, Paris (FR)

(73) Assignee: ST-ERICSSON SA, Plan-Les-Ouates (CH)

(*) Notice: Subject to any disclaimer, the term of this patent is extended or adjusted under 35 U.S.C. 154(b) by 352 days.

(21) Appl. No.: 13/817,222

(22) PCT Filed: Aug. 22, 2011

(86) PCT No.: PCT/EP2011/064340
§ 371 (c)(1),
(2), (4) Date: Feb. 15, 2013

(87) PCT Pub. No.: WO2012/028480
PCT Pub. Date: Mar. 8, 2012

(65) Prior Publication Data
US 2013/0148738 A1    Jun. 13, 2013

Related U.S. Application Data

(60) Provisional application No. 61/411,682, filed on Nov. 9, 2010.

(30) Foreign Application Priority Data

Aug. 31, 2010    (EP) .................................... 10305930

(51) Int. Cl.
*H04N 7/12*    (2006.01)
*H04N 11/02*    (2006.01)
(Continued)

(52) U.S. Cl.
CPC ....... *H04N 19/00587* (2013.01); *H04N 19/105* (2014.11); *H04N 19/17* (2014.11); *H04N 19/192* (2014.11); *H04N 19/51* (2014.11); *H04N 19/527* (2014.11)

(58) Field of Classification Search
None
See application file for complete search history.

(56) References Cited

U.S. PATENT DOCUMENTS 5,706,059 A * 1/1998 Ran et al. ...................... 348/699
6,008,852 A * 12/1999 Nakaya ................ H04N 19/105
348/699

(Continued)

FOREIGN PATENT DOCUMENTS

WO    2006/124237 A2    11/2006

OTHER PUBLICATIONS

Ding et al., "Motion Vector Estimation Using Line-Square Search Block Matching Algorithm for Video Sequences", EURASIP Journal on Applied Signal Processing, pp. 150-1756, vol. 11, 2004.*

(Continued)

*Primary Examiner* — Tracy Li
*Assistant Examiner* — Mohammad J Rahman
(74) *Attorney, Agent, or Firm* — Patent Portfolio Builders PLLC

(57) ABSTRACT

An image sequence comprises at least a first image and a second image. A motion vector (MV(1)) is associated to these first and second images and is defined in a coordinate system having at least a first direction and a second direction, the second direction being different from said first direction. This motion vector has a first previous component value ($MV_{D1}$ (0)) in the first direction. A method processes both images in order to determine an estimate of the motion vector based on the first previous component value. To this purpose, the method defines a first image portion in the first image and a second image portion in the second image based on the first previous component value of the motion vector. Then, the method determines a first characteristics vector for the first image in the first image portion and a second characteristics vector for the second image in the second image portion. The first and second characteristics vectors are compared to estimate a first shift value between the first and second images. At last, a second current component value and a first current component value are obtained and the motion vector is defined by these first and second current component values.

12 Claims, 6 Drawing Sheets

(51) Int. Cl.
*H04N 11/04* (2006.01)
*H04N 19/51* (2014.01)
*H04N 19/105* (2014.01)
*H04N 19/17* (2014.01)
*H04N 19/192* (2014.01)
*H04N 19/527* (2014.01)

(56) References Cited

U.S. PATENT DOCUMENTS

| | | | | |
|---|---|---|---|---|
| 7,206,346 | B2 * | 4/2007 | Shimizu | H04N 19/00587 375/240.17 |
| 7,685,212 | B2 * | 3/2010 | Sebot | G06F 9/30014 708/200 |
| 7,792,191 | B2 * | 9/2010 | Kwon | 375/240.16 |
| 8,649,437 | B2 * | 2/2014 | Tran | H04N 19/577 375/240.12 |
| 2003/0174776 | A1 * | 9/2003 | Shimizu | H04N 19/00587 375/240.16 |
| 2004/0001624 | A1 * | 1/2004 | Curry | G09K 9/00456 382/173 |
| 2004/0001625 | A1 * | 1/2004 | Curry | G06K 9/00456 382/173 |
| 2004/0001648 | A1 * | 1/2004 | Curry | G06K 9/00456 382/302 |
| 2004/0247028 | A1 | 12/2004 | Kim | |
| 2005/0053141 | A1 * | 3/2005 | Holcomb | H04N 19/70 375/240.16 |
| 2005/0053142 | A1 * | 3/2005 | Holcomb | H04N 19/70 375/240.16 |
| 2005/0078755 | A1 * | 4/2005 | Woods | H04N 19/119 375/240.24 |
| 2005/0111555 | A1 * | 5/2005 | Seo | 375/240.17 |
| 2006/0193388 | A1 * | 8/2006 | Woods | H04N 19/647 375/240.16 |
| 2007/0206678 | A1 * | 9/2007 | Kondo | G06T 3/4053 375/240.17 |
| 2007/0248330 | A1 | 10/2007 | Pillman et al. | |
| 2008/0107179 | A1 * | 5/2008 | Nilsson | H04N 19/527 375/240.16 |
| 2008/0186386 | A1 * | 8/2008 | Okada | H04N 5/23248 348/208.4 |
| 2009/0086814 | A1 * | 4/2009 | Leontaris | H04N 19/105 375/240.02 |
| 2010/0020244 | A1 * | 1/2010 | Mitsuya | G06T 7/2026 348/699 |
| 2013/0142266 | A1 * | 6/2013 | Strom et al. | 375/240.16 |

OTHER PUBLICATIONS

Erturk, "Digital Image Stabilization with Sub-Image Phase Correlation Based Global Motion Estimation", IEEE Transaction on Consumer Electronics vol. 49, No. 4, Nov. 2003.*

Sauer et al., "Efficient Block Motion Estimation Using Integral Projections", IEEE transactions on circuits and systems for video technology, vol. 6, No. 5, Oct. 1996.*

International Search Report issued in corresponding International application No. PCT/EP2011/064340, date of mailing Jan. 19, 2012.

Angelo Bosco et al., "Digital Video Stabilization Through Curve Warping Techniques," IEEE Transactions on Consumer Electronic, IEEE Service Center, New York, NY, US, vol. 54, No. 2, May 1, 2008, pp. 220-224, XP011229883, ISSN: 0098-3063; DOI:10.1109/TCE.2009.4560078.

Stephen C. Cain et al., "Projection-Based Image Registration in the Presence of Fixed-Pattern Noise," IEEE Transactions on Image Processing, IEEE Service Center, Piscataway, New Jersey, US, vol. 10, No. 12, Dec. 1, 2001, pp. 1860-1872, XP011025877, ISSN: 1057-7149.

* cited by examiner

GLOBAL MOTION VECTOR ESTIMATION

FIELD OF THE INVENTION

The present invention generally relates to image processing of a series of at least two images, and more particularly it relates to estimation of motion between two images of such a series of images.

RELATED ART

A lot of applications for image processing are based on motion estimation. It can be the case for video stabilization processing, for video image rate up-conversion, etc. In general, a motion is estimated between two different images, for example between two images of a series of images such as a video sequence notably. This estimated motion may be expressed as a global motion vector.

For instance, the document US 2007/0236579 describes a method for generating a component of a global motion vector estimate by selecting a minimum projection correlation error value among a set of projection correlation error values generated on the basis of a first plurality and a second plurality of projections from respectively a first image and a second image.

Such a method enables to determine global motion vectors to be associated to some images of a video sequence. However, such a method can lead to false results, especially when the effective global motion between two images corresponds to important amplitude.

Thus, there is a need for improved motion estimation.

SUMMARY OF THE INVENTION

To address these needs, a first aspect of the present invention relates to a method of motion estimation for processing images in an image sequence comprising at least a first image and a second image, a motion vector being associated to said first and second images and being defined in a coordinate system having at least a first and a second direction, said second direction being different from said first direction;

said motion vector having a first previous component value in the first direction;

said method comprising the steps of:

/a/ defining a first image portion in the first image and a second image portion in the second image based on said first previous component value of the motion vector;

/b/ determining a first characteristics vector $S_c$ for the first image in the first image portion and a second characteristics vector $S'_c$ for the second image in the second image portion;

/c/ estimating a first shift value between said first and second images by comparing said first and second characteristics vectors;

/d/ obtaining a second current component value based on said first shift value; and /e/ obtaining a first current component value;

wherein the motion vector is defined by the first and second current component values.

The term "image" can correspond to any type of numerical picture which is captured by any type of caption device, or which is generated in a virtual way for instance, e.g. animated. It can be an image like a photo captured with a camera, or any type of image in a video captured with a video camera.

Typically, an image is composed of a matrix of pixels organized in columns and rows, or composed of array of voxels, for 3D images.

Each pixel can for example be characterized by its luminance and by two characteristics of chrominance.

In the present context, the terms "motion vector" refer to a vector comprising at least a first and a second component value, which is linked to a pair of images. Of course, the number of components depends on the dimension of the considered images.

Such a motion vector may represent a global motion of a scene captured in the considered image sequence, and more precisely in the considered pair of images. Of course, here, the terms 'image sequence' can correspond to any two images, which can be provided by any same or different electronic devices. No limitation is attached to the considered pair of images. For example, the two images may or may not be part of a video sequence.

According to embodiments of the invention, a motion vector may be obtained at the end of the method, at steps /d/ and /e/. This motion vector is defined by its first and second current component values. More precisely, it is advantageously planned to obtain the second current component value from a first previous component value. There is no limitation associated to this first previous component value. A component value in one direction may be obtained from a component value in another direction of the coordinate system. Such a characteristic allows basing a motion vector estimation on relevant image portions in both first and second images.

In order to determine such a motion vector, it is beneficial to define a coordinate system. Such a coordinate system can be according to at least two different directions. But, no limitation is associated to one embodiment of the present invention regarding the number of different directions in the coordinate system. Indeed, it is very easy to deduce an application of one embodiment of the present invention to a coordinate system of p dimensions, from one embodiment applied to a coordinate system of two dimensions. Consequently, it is important to note that the present invention can be easily applied to any type of image sequence of any dimensions.

No limitation is associated to the definition of such a coordinate system in p dimensions, p strictly greater that 1. It can be defined by an origin and p coordinate vectors according to p different directions adapted to represent a space of p dimensions, such coordinate vectors having any norm values.

In some embodiments of the present invention, such directions can be following the axis of the matrix of pixels. In two dimensions for instance, the coordinate system can be defined by a first coordinate vector following the horizontal axis of an image and a second coordinate vector following the vertical axis of the image.

The terms "image portion" are understood to mean a subset of pixels in an image which can be considered to be relevant to determine a motion vector. According to some embodiments of the present invention, a first image portion and a second image portion are respectively defined in the first and second images for which a motion vector is to be obtained.

More precisely, advantageously, these first and second image portions can be defined based on a previous component value in one direction. In these conditions, it is possible to use this previous component value to determine a common overlap area of the scene in both first and second images. Thus, the determination of the motion vector can be advantageously performed by considering relevant image portions in each image. Thus, characteristic vectors are generally not calculated based on the whole images but based on image portions determined on the basis of a first previous component value.

Indeed, in this context, for a given previous component value, the first image portion of the first image can be defined so that each pixel of this first image portion, when shifted by the first previous component value, still belongs to this first image. In the same way, the second image portion of the second image can be defined so that each pixel of this second image portion, when shifted by the opposite of the first previous component value, still belongs to this second image.

These first and second image portions enable to determine, in a relevant way, the second current component value of the motion vector, because the areas taken into consideration in both first and second images can be restrained thanks to the first previous component value. The image portions are determined so that they tend to be overlapping areas, that is to say that they are present on both the first and the second images.

Thus, the results obtained for the motion vector are reliable, even if a considerable motion occurs between the first and the second images regarding the captured scene. Defining an image portion advantageously enables to avoid comparing non overlapped areas between the first and second images and then permits to have a better estimation of the shift between the first and second images.

A image portion can be, for example, a group of pixels belonging to a subset of columns from the columns of pixels in an image.

The term "characteristics vector" is understood to mean any vector representing some characteristics values of at least some pixels in the considered image portion, on a row, a column, or a combination of rows and columns of the image portion. The characteristic that is taken into account can for example be the luminance associated to each pixel.

For instance, the coordinate system has a vertical direction and a horizontal direction. A characteristics vector component in the vertical direction can then be calculated by summing the luminance of at least some pixels in a particular row. After obtaining a first characteristics vector for the first image and a second characteristics vector for the second image, these first and second characteristics vectors can be matched.

Any type of comparing process applied on first and second characteristics vectors can be performed here to estimate a first shift value between first and second images. Such a step of comparing can correspond to a step of matching the characteristics vectors.

For instance, it is possible to take into consideration a first set of components among the first characteristics vector components and a second set of components among the second characteristics vectors components shifted by different shift value candidates.

Then, based on a comparison between first set and second sets of component, a first shift value can be selected among all the shift value candidates, corresponding to the shift value candidate allowing the best match.

On the basis of this first shift value, a second current component value of the motion vector is obtained. For instance, the second current component value can be directly the first shift value. Other examples are easy to obtain from this simple case. Notably, when it is planned to repeat some steps of the method, it is possible to apply a filter depending on any previous results.

It is possible, at step /e/, to consider the first previous component value as a first current component value, for example. But, there are other ways to determine this first current component value. It can be planned to obtain the first current component value based on the second current component value, according to a similar way performed to obtain the second current component value based on the first previous component value.

Thus, for this purpose, according to some embodiments, step /e/ can comprise the following steps:
  defining a third image portion in the first image and a fourth image portion in the second image based on the second current component value;
  determining a third characteristics vector Sc" for the first image in the third image portion and a fourth characteristics vector Sc'" for the second image in the fourth image portion;
  estimating a second shift value between said first and second images by comparing said third and fourth characteristics vectors; and
  obtaining the first current component value based on said shift value.

This context enables advantageously to determine both first and second current component values of the motion vector based on parts of first and second images obtained after removing some non overlapped areas.

It results in an improved accuracy of the estimation of the motion vector in both directions of the coordinate system.

In some embodiments of the invention, the method further comprises the following step of:
  /f/ repeating N times steps /a/ to /e/, the first previous component value in repeated step /a/ being the first current component value obtained at the previous execution of step /e/;
  N being an integer greater than or equal to 1.

Here, it is planned to perform a plurality of iterations of a same series of steps /a/ to /e/, in order to improve preciseness of the motion vector at the end of each iteration. These iterations are stopped when a given number N+1 of the sequence of steps /a/ to /e/ is performed. It is possible to control exactly the number of iterations and then time consumed to perform this method.

This embodiment enables to determine with more accuracy the first and second current components of the motion vector, by progressively reducing image portions in repeated steps /a/ and /e/ at least for some iterations and thus reducing the non overlapped areas taken into account. Indeed with N equal to 2, an accuracy of one pixel is generally obtained in the determination of the motion vector.

In another embodiment of the invention, the method comprises the following step of:
  /g/ repeating steps /a/ to /e/ while the first and second current component values of the motion vector do not satisfy a criterion, the first previous component value in repeated step /a/ being the first current component value obtained at the previous execution of step /e/.

Here, it is also planned to perform a plurality of iterations of steps /a/ to /e/. But, these iterations are stopped when a criterion is satisfied. Thus, by defining an adapted test based on such criterion, it is possible to guarantee a certain level of motion vector quality.

The term "criterion" can be adapted to any type of test, as any comparison test with prefixed thresholds, any series of comparison test, any equality test, etc. When such a criterion is reached, iterations are stopped. It is also advantageously possible to determine an accuracy level by fixing a particular criterion corresponding to this accuracy level. The method progressively improves the restriction to the image portion to satisfy the requirement.

In some embodiments, the second current component value of the motion vector at the end of each iteration of steps /a/ to /e/ being considered as second previous component value for the next iteration of steps /a/ to /e/, the criterion is satisfied when the absolute value of the difference between the first current component value and the first previous component value is lower than or equal to a first threshold value, and the absolute value of the difference between the second current component value and the second previous component value is lower than or equal to a second threshold value.

Indeed, the first and second current component values progressively converge to two convergence values. By fixing the first and second thresholds to zero for example, the method is iterated until these two convergence values are reached. Thus, unlike the prior art, the method described herein advantageously computes the motion vector at an accuracy level which can be fixed by fixing the threshold values. This aspect allows a high flexibility.

In some embodiments, if between steps /d/ and /e/ the motion vector having the second current component value and the first previous component value satisfies the criterion, then the first current component value can be the first previous component value and step /e/ can be skipped.

Here, as soon as the current components of the motion vector satisfy the criterion, even if this criterion is satisfied after obtaining the second current component but before obtaining the first current component, it is planned to stop the method according to some embodiments.

Advantageously, this characteristic allows avoiding a step /e/, expected to provide a first current component, which would not be improved, because the criterion can be satisfied with the first previous component.

Thus, a potentially unnecessary step /e/ can be advantageously avoided in case the criterion was already satisfied after the determination of the second current component value in step /d/.

The first previous component value can be initialized to zero value. Then, the method is iterated a first time and the first and second image portions determined at step /a/ respectively correspond to the first and the second image. Thus, advantageously, no part of the first and second images is eliminated as non overlapped area, given that there is no indication about the motion vector before the first iteration.

At step /c/, the following steps are performed:
determining a set of shift value candidates;
obtaining a set of metrics, by performing the following steps for each shift value candidate:
  selecting a first set of components from components ($Sc(i)$) of the first characteristics vector (Sc) based on said shift value candidate;
  selecting a second set of components from components ($Sc'(i)$) of the second characteristics vector (Sc') based on said shift value candidate; and
  calculating one metrics between said first and second set of components; and
determining the first shift value by selecting the shift value candidate which corresponds to an extremum value metrics of said set of metrics;
wherein, at step /d/, the extremum value metrics is associated to the second current component value.

According to a general way, it is planned to estimate a shift value between two images based on a comparing (or correlation) between both corresponding characteristics vectors. This shift value is advantageously used to obtain a current component value for the motion vector (which can be the second current component for step /d/ and the first current component for step /e/ according to some embodiments).

There is no limitation regarding the type of comparing to be applied on both characteristics vectors.

Here, based on a plurality of shift value candidates, a plurality of metrics are calculated, each metric indicating the relevancy level of each shift value candidate. Then, based on these metrics, it is possible to select the shift value candidate which is the most relevant to represent the real shift between the first and the second images. This shift value is used to determine the current component value according to some embodiments.

For the following, it can be useful to associate the metrics to said current component, in order to keep track of the relevancy level of this current component.

The term 'metrics' can cover any value representing a potential distance between two characteristics vectors associated to two respective images or any value representing a similarity indication.

Such metrics can be obtained by applying any type of computation on both characteristics vectors.

For instance, such metrics can be obtained by applying a Sum of Squared Error (SSE) computation or a Sum of Absolute Differences (SAD) (for instance for potential distance) or a cross correlation computation (for instance for similarity indication), For illustration purpose only, in the following sections, it will be considered that the metrics are obtained by SAD method. However, it is very easy to deduce an application with any other type of metrics.

A SAD between first and second sets of components having the same size corresponds to the sum of the absolute values of the difference between corresponding components of the respective sets. Two components are considered as corresponding components when they have the same index in the respective sets.

To obtain a SAD based on applying a given shift value candidate, it can be planned to compute a SAD on a first set of components of the first characteristics vector and a second set of components of the second characteristics vector. The second set of components is determined based on the shift value candidate.

Comparing the SAD is a way to estimate a level of comparison between the first and the second characteristics vectors. For example, a SAD is computed for each considered shift value candidate between the first and the second characteristic vectors that can represent the projections of the luminance of each pixel in a particular direction.

The set of shift value candidates can be defined based on a threshold value: said threshold value denotes a maximal allowed motion to be considered, all shift value candidates having an absolute value being lower than said threshold value. Such a threshold may be either fixed or may be adaptive.

By minimizing the SAD between the first and second characteristics vectors by varying the shift value candidates, a first shift value is advantageously obtained based on objective criterion for comparing the first and second characteristics vectors.

The method can further comprise the following steps for at least a current component value among the first and the second current component values:
obtaining at least a first and a second corresponding supplementary component values by adding two respective offsets to the corresponding current component value;
obtaining a set of metrics, by performing the following steps for each corresponding supplementary component value:

selecting a first set of components from components (Sc(i)) of the first characteristics vector (Sc) based on said corresponding supplementary component value;

selecting a second set of components from components (Sc'(i)) of the second characteristics vector (Sc') based on said corresponding supplementary component value; and calculating one metrics, associated to corresponding supplementary component value, between said first and second set of components;

obtaining an interpolation curve by interpolating at least three points defined by first and a second corresponding supplementary component values and the corresponding current component value as abscissas, and by their respective associated metrics as respective ordinates; and selecting as said current component value one of said abscissas corresponding to an ordinate which is an extremum value on said interpolation curve.

It can be noted that the previous steps can be applied either on first current component value, meaning according to the first direction, or on second current component value, meaning according to the second direction. For the following, the term 'current component value' can mean either the first or the second current component value.

Thanks to these characteristics, advantageously, the accuracy of the motion vector can be improved by performing such interpolation.

For that purpose, two corresponding supplementary component values are determined from the corresponding current component value by adding two respective offsets.

No limitation is attached to the value of these offsets. In some embodiments, these offsets can be opposite values.

The term "interpolation" refers to a construction of a continuous function on the basis of a discrete set of points. Thanks to these characteristics, it is possible to obtain a metrics function, which can be a SAD function for instance, and to determine a point provided by this function which corresponds to an extremum of this function.

In some embodiments, it can be advantageous to take into account an offset value of +1 and another offset value of −1 to obtain the two supplementary component values. Offset value can, for example, be expressed as a number of pixels.

Thus, in some embodiments, it is planned to calculate (or otherwise achieve) the two metrics associated with these corresponding supplementary component values. On the basis of the current component value and the two corresponding component values, an interpolation is built and the component value that minimizes the SAD function can be deduced from the curve of this function. The ordinate of the point on the curve which has the minimum value of metrics is selected as the current component value, which is then updated.

The interpolation permits advantageously to improve the accuracy of the method. Indeed, the best accuracy level that could be reached without interpolation is one pixel, whereas the interpolation allows determining the abscissa, and thus the component value, that corresponds to an ordinate which is an extremum of the function. Thus, it is possible to obtain a high level of precision regarding these abscissa and ordinate values.

The method can further comprise the following steps:

obtaining at least a first and a second corresponding supplementary component values by adding two respective offsets to the corresponding current component value;

obtaining a set of metrics, by performing the following steps for each corresponding supplementary component value:

selecting a first set of components from components Sc(i) of the first characteristics vector Sc based on said corresponding supplementary component value;

selecting a second set of components from components Sc'(i) of the second characteristics vector Sc' based on said corresponding supplementary component value; and calculating one metrics, associated to corresponding supplementary component value, between said first and second set of components;

obtaining an interpolation curve by interpolating at least three points defined by the first and second corresponding supplementary component values and the corresponding current component value as abscissas, and by their respective associated metrics as respective ordinates;

obtaining a determined abscissa, among said abscissas, corresponding to an ordinate which is an extremum value on said interpolation curve;

obtaining an abscissa as said current component value by rounding said determined abscissa to a predetermined fraction of pixel.

The predetermined fraction of pixels allows simplifying the following calculations which are performed on the basis of the current component value and improving the preciseness of the method at the same time.

A second aspect of the invention relates to a circuitry for processing series of images adapted to perform a method of motion estimation according to the first aspect of the invention.

A third aspect of the invention relates to an electronic device comprising a circuitry according to the second aspect of the invention. Such an electronic device can correspond for instance to a mobile telephone or a digital camera. The electronic device can include circuitry for processing images, adapted to perform a method comprising processing images in an image sequence comprising at least a first image and a second image, a motion vector being associated to said first and second images and being defined in a coordinate system having at least a first direction and a second direction, said second direction being different from said first direction, said motion vector having a first previous component value in the first direction;

/a/ defining a first image portion in the first image and a second search area in the second image based on said first previous component value of the motion vector;

/b/ determining a first characteristics vector for the first image in the first image portion and a second characteristics vector for the second image in the second image portion;

/c/ estimating a first shift value between said first and second images by comparing said first and second characteristics vectors; and /d/ obtaining a second current component value based on said first shift value; and /e/ obtaining a first current component value;

wherein the motion vector is defined by the first and second current component values.

A fourth aspect of the invention relates to a computer program product comprising a non-transitory computer readable medium having stored thereon computer program instructions loadable into a computing device and adapted to—when loaded into and executed by said computer device—cause the computing device to perform a method according to the first aspect of the invention. For example, the stored instructions loadable—when loaded into and executed by said computed device—cause the computing device to perform a method comprising processing images in an image sequence comprising at least a first image and a second image, a motion vector being associated to said first and second images and being defined in a coordinate system having at least a first direction and a second direction, said second direction being different from said first direction, said motion vector having a first previous component value in the first direction;

/a/ defining a first image portion in the first image and a second search area in the second image based on said first previous component value of the motion vector;

/b/ determining a first characteristics vector for the first image in the first image portion and a second characteristics vector for the second image in the second image portion;

/c/ estimating a first shift value between said first and second images by comparing said first and second characteristics vectors; and /d/ obtaining a second current component value based on said first shift value; and /e/ obtaining a first current component value; wherein the motion vector is defined by the first and second current component values.

DESCRIPTION OF PREFERRED EMBODIMENTS

Figure 1A:
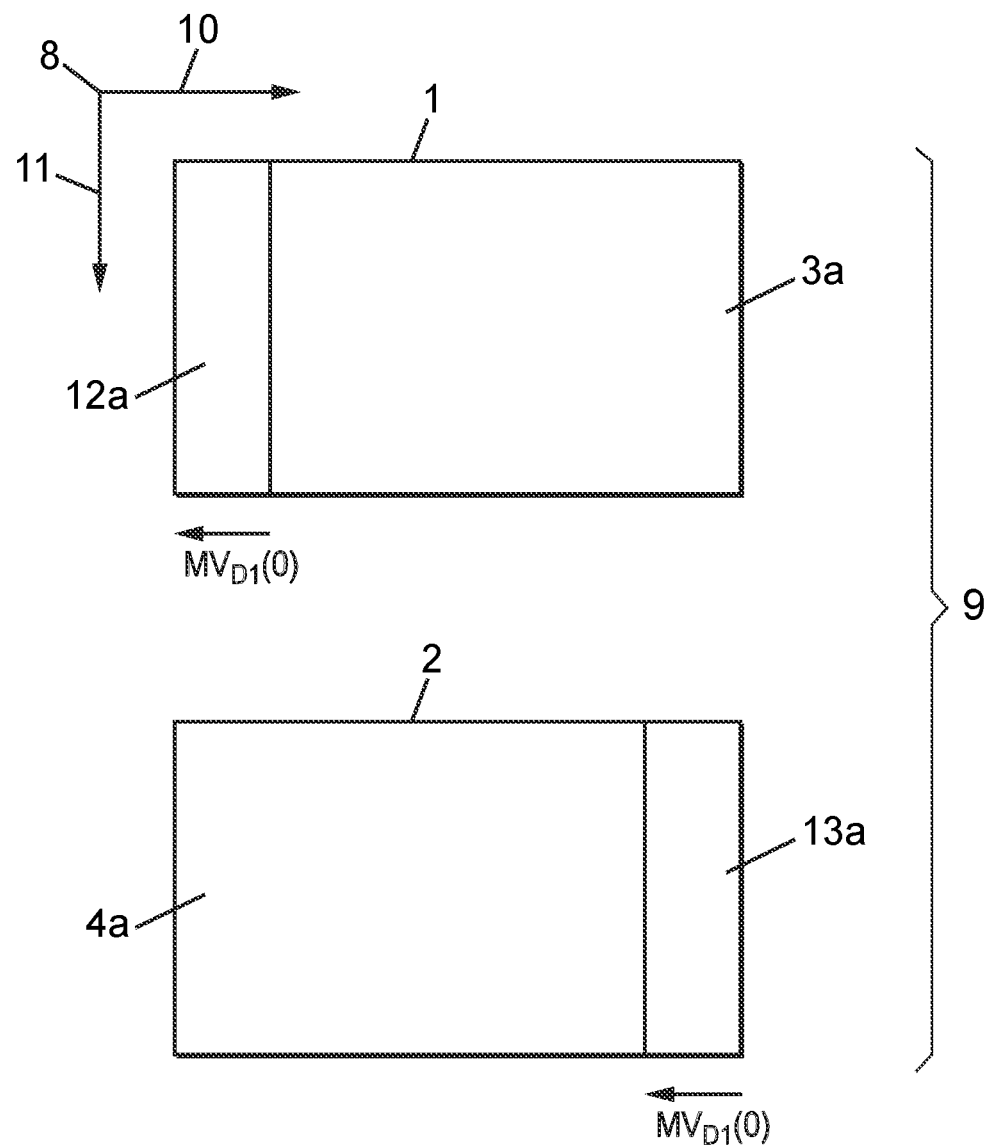
FIGS. 1a and 1b illustrate a sequence of images comprising a first image and a second image on which a motion estimation method can be applied in some embodiments of the present invention.
Figure 1B:
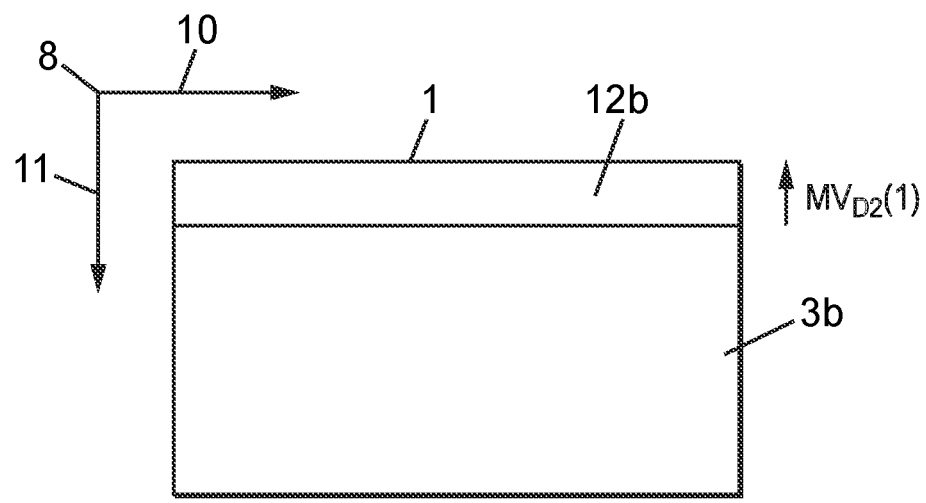

FIGS. 1a and 1b illustrate a sequence 9 of images comprising a first image 1 and a second image 2. No restriction can be attached to the type of these images. For example, the images 1 and 2 can be taken successively by the same camera (video capture, camera with multishot mode) or simultaneously by two distinct cameras (for 3D applications for instance).

For clarity of purpose, the following sections are relative to an application to 2D images. But, it is easy to deduce an application to 3D images.

A coordinate system 8 is attached to the sequence 9, comprising a first coordinate vector 10 in a first direction D1 which is horizontal and a second coordinate vector 11 in a second direction D2 which is vertical. The object of the invention is not restricted to perpendicular directions D1 and D2. In a general way, it is possible to consider any type of coordinate system, as soon as it is adapted to make reference to any pixel in these images. In particular, depending on an inclination angle according to which images 1 and 2 have been acquired, a given angle can be defined between the first and the second directions D1 and D2, the given angle being different from 90 degrees. In what follows, the specific example of perpendicular directions is considered for the sake of simplicity.

Each of the images 1 and 2 is composed of a matrix of pixels characterized by characteristics like luminance value Y or chrominance values C1 and C2 for example.

Figure 2:
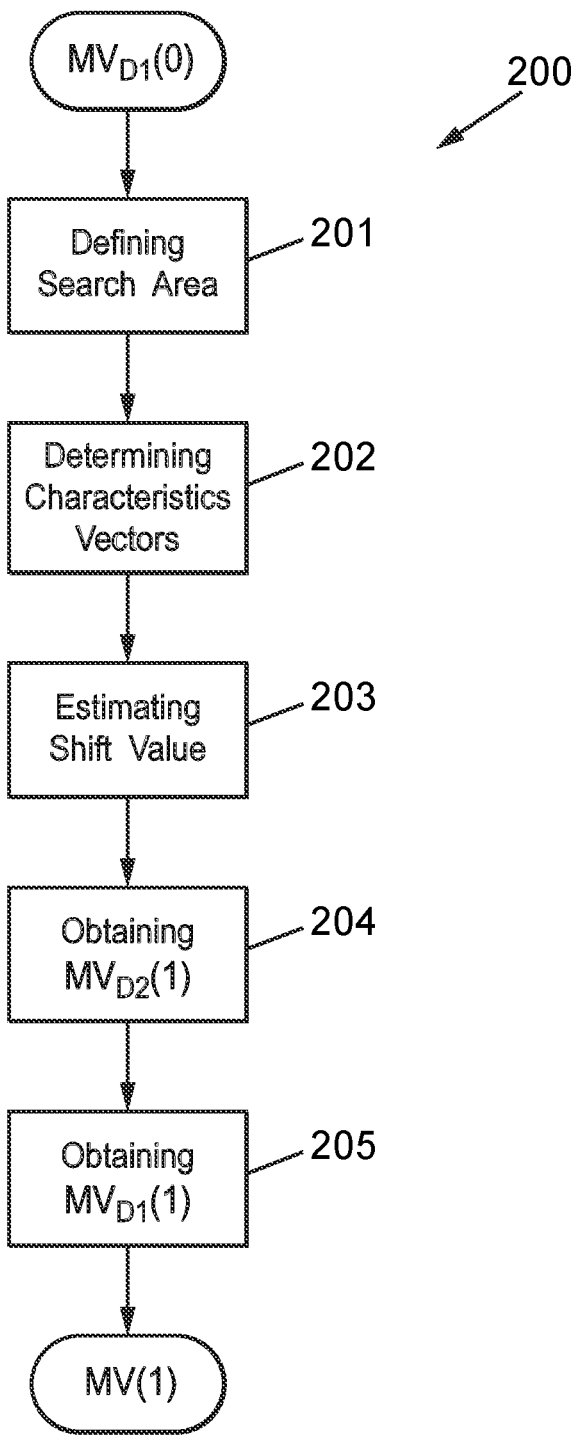
FIG. 2 illustrates the main steps of a motion estimation method according to some embodiments of the present invention.

FIG. 2 illustrates the main steps of a motion estimation method according to some embodiments of the present invention.

Such a method 200 of motion estimation can be advantageously applied on the first and second images 1 and 2, in order to obtain a motion vector MV(1). This motion vector can be defined in the coordinate system 8, by a first current component value $MV_{D1}(1)$ in the first direction D1 and a second current component value $MV_{D2}(1)$ in the second direction D2.

A first previous component value is referred as $MV_{D1}(0)$, which can be equal to 0. Its value can be determined without any limitation. Some following sections are relative to iterations of some steps of the method. In this case, of course, this value of the first previous component value can be the value determined in a previous iteration of the method.

Here, for illustration purpose, the first previous component value is chosen as a negative value. This previous component value is used in order to determine relevant image portions in both first and second images in step 201.

Figure 1B:
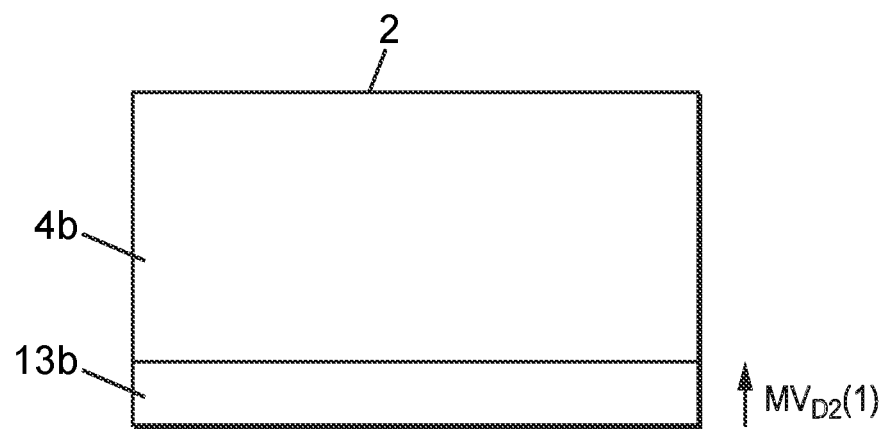

On FIG. 1-a, such image portions are illustrated according to some embodiments.

Thus, a first image portion 3a and a second image portion 4a are defined 201 in the first image 1 and the second image 2 respectively, on the basis of a first previous component value $MV_{D1}(0)$ corresponding to the first direction D1.

In this example, the first previous component value $MV_{D1}(0)$ being negative, the global horizontal movement between the first image 1 and the second image 2 is in the left sense. With such a first previous component value, a part 12a of the first image 1 and a part 13a of the second image 2 can be eliminated, as being non overlapped areas between first and second images.

The part 12a is composed of pixels which can not be translated horizontally of the first previous component value $MV_{D1}(0)$ without being sent off the first image 1. Similarly, the part 13a is composed of pixels which can not be translated horizontally of the opposite of the first previous component value $MV_{D1}(0)$ without being sent off the second image 2.

The first image portion 3a corresponds to the image 1 excepted the part 12a and the second image portion 4a corresponds to the second image 2 excepted the part 13a.

At step 202, it is planned to determine a first characteristics vector Sc corresponding to the first image 1 and a second characteristics vector Sc' corresponding to the second image 2, taking into account only the first image portion 3a and the second image portion 4a. Such characteristics vectors can be for instance based on luminance value Y of each pixel.

For instance, considering the coordinate system illustrated in the FIG. 1, comprising a horizontal and a vertical direction D1 and D2, a first and a second characteristics vectors Sc and Sc' can be obtained by summing the luminance values Y of all pixels in a given row, in both first area 3a and second image portion 4a respectively. Characteristics vectors Sc and Sc' also have a number of components, respectively referred as Sc(i) and Sc'(i), corresponding to the number h of pixel rows of images 1 and 2. Advantageously, not all pixels of both images are taken into account.

As previously explained, perpendicular directions are only considered for the sake of simplicity. However, the characteristic vectors can also be obtained when directions D1 and D2 are not perpendicular by considering rows that are inclined at the given angle with a horizontal direction and by summing the luminance values Y of all pixels of a given inclined row.

At step 203, the first and the second characteristics vectors Sc and Sc' can be then matched together in order to estimate a first shift value k(1) between images 1 and 2.

As in this example, the previous component value being considered as being horizontal, the first shift value estimated at this step 203 is along the second direction. Then, it is a vertical shift value.

In some embodiments, characteristics vectors Sc and Sc' can be matched by computing any type of metrics illustrating a correlation level between these both characteristics vectors, and then, indirectly, between both images 1 and 2, after applying the first shift value.

Such metrics can be obtained by computing a sum of absolute differences (SAD). In such conditions, it is planned to define a set of shift value candidates. A set of SAD values are then obtained for all respective shift value candidates. The shift value is this which minimizes the metrics (or SAD) among all shift value candidates.

In some embodiments, the vertical shift value k(1) can thus be obtained by application of the following formula:

$$k(1) = k \Big/ \min\left[\sum_{i=MV_{D2max}}^{h-1-MV_{D2max}} |Sc(i) - Sc'(i+k)|\right]$$

where $MV_{D2max}$ is a maximum value which is considered for the vertical motion;

where k is an integer varying between $-MV_{D2max}$ and $MV_{D2max}$, where h is the number of rows in images 1 and 2.

Thanks to this formula, k(1) is the value of k, integer comprised between $-MV_{D2max}$ and $MV_{D2max}$, which minimizes the following correlation between characteristics vectors:

$$\left[\sum_{i=MV_{D2max}}^{h-1-MV_{D2max}} |Sc(i) - Sc'(i+k)|\right]$$

Other metrics than SAD may have been considered as Sum of Squared Error (SSE) or cross correlation.

Then, at step 204, the second current component value $MV_{D2}(1)$ can be obtained on the basis of the previously determined vertical shift value k(1). In some embodiments, the second current component value $MV_{D2}(1)$ is equal to the vertical shift value k(1). But, it is possible to apply any type of filter to the vertical shift value in order to determine the second current component value. For instance, such a filter can be an exponential filter over successive iterations.

At step 205, the first current component value $MV_{D1}(1)$ is obtained.

For example, this first current component value can correspond to the first previous component value, i.e. being kept unchanged.

The first current component value $MV_{D1}(1)$ can also be obtained in a similar way as the second current component value $MV_{D2}(1)$ as it is illustrated by FIG. 1-a.

More precisely, on FIG. 1-b, for illustration purpose only, it is considered that the second current component value $MV_{D2}(1)$ is negative. Image portions 3b and 4b are respectively defined by eliminating parts 12b and 13b of the first and the second images 1 and 2. The part 12b is composed of pixels which can not be translated vertically of the second current component value $MV_{D2}(1)$ without being sent off the first image 1. Similarly, the part 13b is composed of pixels which can not be translated vertically of the opposite of the second current component value $MV_{D2}(1)$ without being sent off the second image 2. The first current component value $MV_{D1}(1)$ can then be obtained on the basis of the second current component value $MV_{D2}(1)$ (instead of first previous component value which is used to obtain the second current component value) by using a third and a fourth characteristics vectors Sc" and Sc'" that are horizontal in this case.

For instance, considering the coordinate system illustrated in the FIG. 1b, comprising a horizontal and a vertical direction D1 and D2, characteristics vectors Sc" and Sc'" can be obtained by summing the luminance values Y of all pixels in a given column, in both first area 3b and second image portion 4b respectively.

More precisely, these third and fourth characteristics vectors Sc" and Sc'" have a number of components, respectively referred as Sc'(i) and Sc'"(i), corresponding to the number w of pixel columns of images 1 and 2. Advantageously, not all pixels of both images are taken into account.

As previously stated, a metrics can be computed to determine second shift value k(2), which is horizontal and corresponds to a comparison level, or correlation level, between the third characteristics vector and the fourth characteristics vector which is shifted of a shift value candidate.

For instance, the metrics can be based on the sum of the luminance values of the pixels for all columns or rows of images 1 and 2.

In some embodiments, the first current component value $MV_{D1}(1)$ is equal to the horizontal shift value k(2). But, it is possible to apply any type of filter to the horizontal shift value in order to determine the first current component value. For instance, such a filter can be an exponential filter over successive iterations.

At this step, a motion vector MV(1) is defined by the first and the second current component values according to some embodiments of the present invention.

In order to keep track of the correlation level which is associated to both current component values of this motion vector, it can be useful to associate to the first current component value the metrics computed for the second shift value estimated at step /e/ (when the first current component value is computed by steps which are similar to steps /a/-/d/), and associate to the second current component value the metrics computed for the first shift value estimated at step /c/.

Thus, a SAD value associated to the second current component value $MV_{D2}(1)$ can correspond to the following formula:

$$SAD(MV_{D2}(1)) = \left[\sum_{i=MV_{D2max}}^{h-1-MV_{D2max}} |Sc(i) - Sc'(i+MV_{D2}(1))|\right]$$

Figure 3:
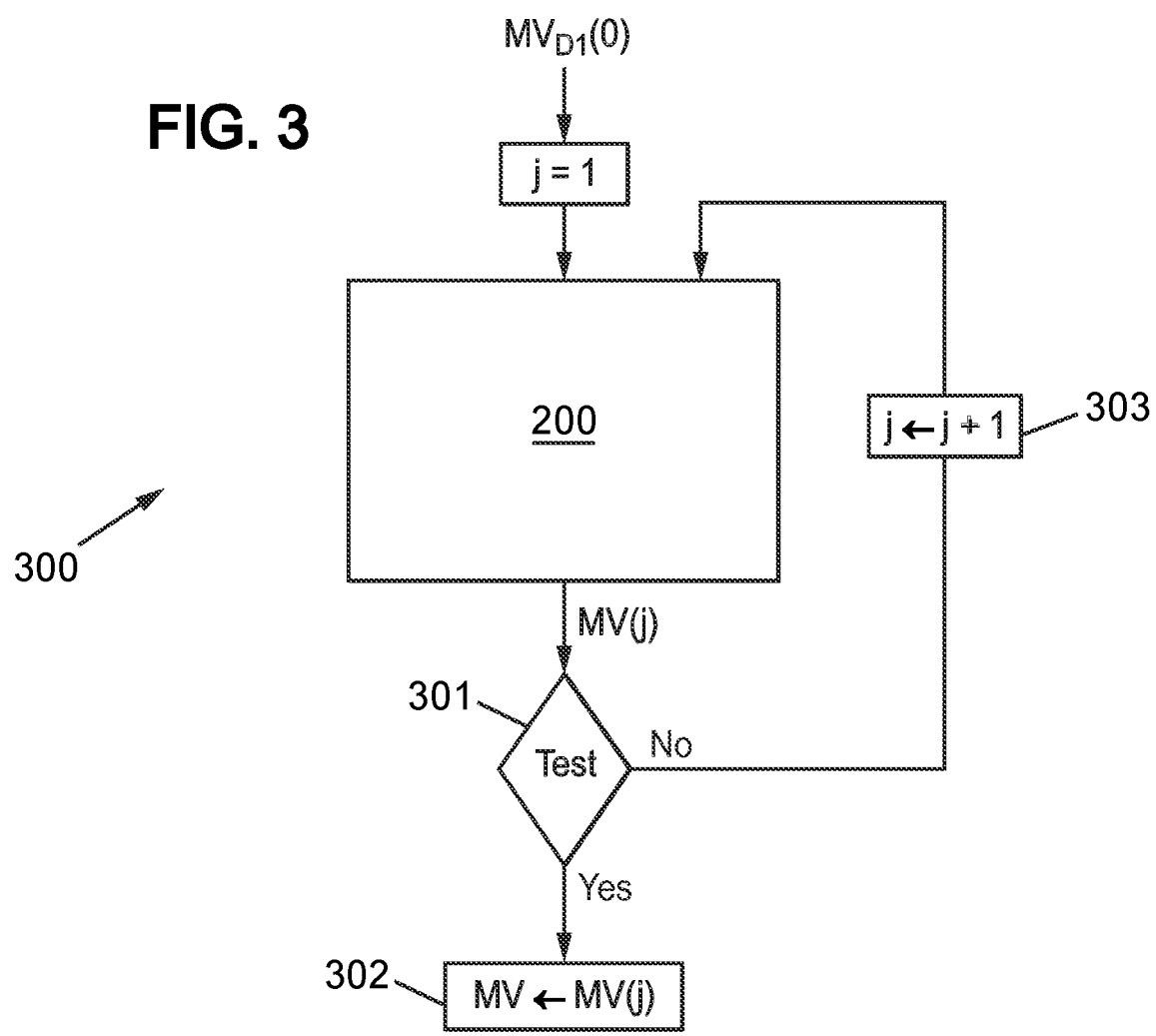
FIG. 3 illustrates a motion estimation method based on iteration of steps according to some embodiments of the present invention.

FIG. 3 illustrates a motion estimation method based on iteration of steps according to some embodiments of the present invention.

Such a motion estimation method 300 can allow improving an accuracy level of motion estimation method 200.

A block 200 corresponds to all steps illustrated on FIG. 2. In a first iteration, an index j is initialized to 1 and the motion estimation method 200 is processing the first previous component value $MV_{D1}(0)$ to obtain the motion vector MV(1) comprising the first and second current component values $MV_{D1}(1)$ and $MV_{D2}(1)$ in the same way as stated in reference to FIG. 2.

In some embodiments, for the first iteration, it is possible to take as initial value, the first previous component value equal to 0.

At the end of each iteration of block 200, at a step 301, it is checked if the motion vector MV(1) satisfies a given criterion. In some embodiments of the invention, the criterion can be based on at least one comparison. Indeed, at least one threshold value can be defined regarding either the first current component value or the second current component value in order to decide if the motion vector is enough relevant.

More precisely, in some embodiments, it is possible to apply this type of comparison on both first and second current component values.

Thus, in this condition, the criterion is satisfied when, on one hand, the metrics corresponding to the first current component value is lower than a first threshold value th1 and, on the other hand, the metrics corresponding to the second current component value is lower than a second threshold value th2.

When the metrics is SAD values, if the SAD values corresponding to the first and second current values are inferior to the threshold values th1 and th2 respectively, then it is considered that the accuracy level of the method is sufficient to satisfy a given accuracy requirement fixed by the threshold values th1 and th2. In this case, the motion vector MV(1) is then stored 302 as a motion vector MV.

However, if the motion vector MV(1) does not satisfy the criterion, the method 200 is processed again to obtain motion vector MV(2) on the basis of the first current component value $MV_{D1}(1)$ and j is incremented at step 303. These iterations are repeated to obtain successively motion vectors MV(j) comprising a first current component value $MV_{D1}(j)$ and a second current component value $MV_{D2}(j)$. Iterations are stopped for j corresponding to the motion vector MV(j) satisfying the criterion checked at step 301.

In some embodiments of the invention, the step 301 can be based on a comparison between j and a number of iterations N that is prefixed. Thus, iterations are repeated while j is inferior or equal to N at step 301. The motion vector MV(N) is then stored as motion vector MV.

In some embodiments, it is possible to plan stopping the iteration based on a convergence test. For that purpose, advantageously, the step 301 can be based on the following two comparisons:

$$|MV_{D1}(j) - MV_{D1}(j-1)| \leq th3$$

$$|MV_{D2}(j) - MV_{D2}(j-1)| \leq th4$$

where th3 and th4 are prefixed threshold values respectively associated to the first and second current components, $MV_{D1}(j-1)$ and $MV_{D2}(j-1)$ are the first current component value and the second current component value of motion vector MV(j-1) determined at the previous iteration j, and $MV_{D1}(j)$ and $MV_{D2}(j)$ are the first current component value and the second current component value of motion vector MV(j) determined at the current iteration j.

In this case, if both inequalities are respected, then iterations are stopped and motion vector MV(j) is stored 302 as motion vector MV.

In a particular case, it is possible to apply these comparisons with th3 and th4 equal to 0.

It can be noted that any combination of any type of step 301 can be advantageously performed according to some embodiments. For instance, it is possible to plan to check at first a convergence criterion (with th3 and th4) or a threshold criterion (with th1 and th2) before applying a prefixed number of iteration (with N), in order to limit the number of iterations anyway.

Figure 4:
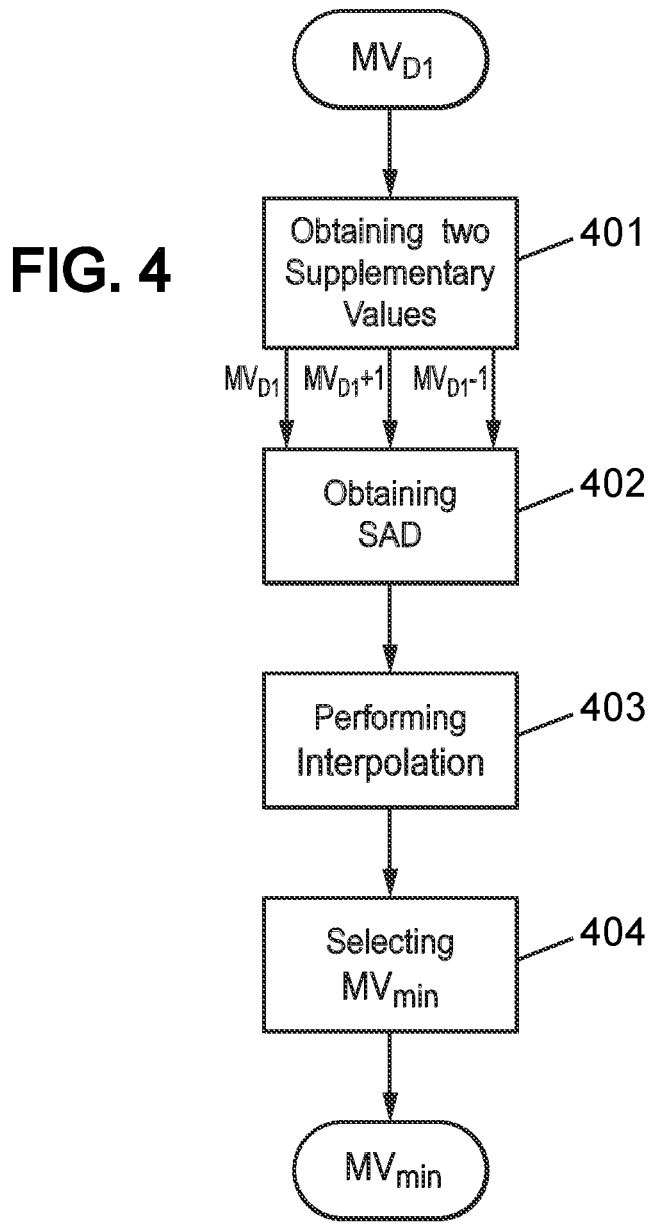
FIG. 4 illustrates a motion estimation method based on interpolation according to some embodiments of the present invention.

FIG. 4 illustrates a motion estimation method based on interpolation according to some embodiments of the present invention.

Here, it is planned to perform an interpolation in order to improve the accuracy of the determination of the motion vector MV between two images 1 and 2.

For illustration purpose, this embodiment is applied to only one direction of the coordinate system. But, it is easy to deduce an application to the other direction.

Steps illustrated on FIG. 4 are performed after obtaining a motion vector MV for the first and second images. The following sections are relative to the first direction.

On the first direction D1, at step 401, two supplementary first component values are obtained on the basis of the motion vector MV having a first current component value $MV_{D1}$. For example, the two supplementary first component values can be obtained by adding two offsets to the first current component value $MV_{D1}$. In a simple case, these offsets can be 1 and −1.

Then, at step 402, for instance when the metrics are SAD, the SAD values corresponding to the two supplementary first components are calculated. Three points P1, P2 and P3 are then defined with the following coordinates:

$$P1[MV_{D1}; SAD(MV_{D1})]$$

$$P2[MV_{D1}-1; SAD(MV_{D1}-1)]$$

$$P3[MV_{D1}+1; SAD(MV_{D1}+1)]$$

where $SAD(MV_{D1})$ is the SAD value corresponding to the first current component value $MV_{D1}$ of the motion vector MV.

The points P1, P2 and P3 are then interpolated 403, for example to obtain a parabolic interpolation and a continuous function F is obtained, taking as input first current component value and providing as output corresponding SAD values. An interpolation is associated to the continuous function F.

At step 404, it is planned to select, as the current component value, the abscissa minimizing the ordinate on the interpolation curve.

Figure 5:
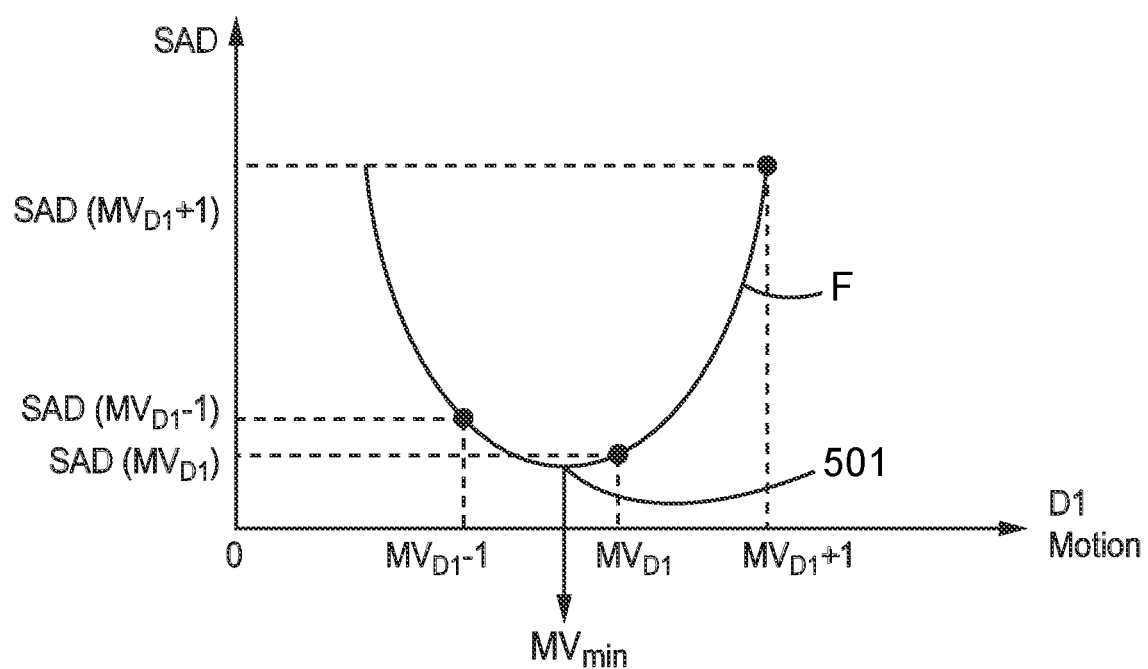
FIG. 5 represents a parabolic interpolation curve according to a function F that can be obtained by the interpolation method of the invention according to some embodiments.

FIG. 5 represents a parabolic interpolation curve according to a function F that can be obtained by the interpolation method of the invention.

The interpolation curve comprises a minimum 501. A first current component value $MV_{min}$ that corresponds to the abscissa of the minimum 501 can then be selected at step 404 and stored as the first current component value.

The accuracy of the determination of the motion vector is improved, notably when $MV_{min}$ is different from an integer, which can correspond to a number of pixels for example.

It is stipulated that the reference signs in the claims do not limit the scope of the claims, but are merely inserted to enhance the legibility of the claims.

The invention claimed is:

1. A method of motion estimation for processing images in an image sequence comprising:
   at least a first image and a second image,
   a motion vector being associated to said first and second images and being defined in a coordinate system having at least a first direction and a second direction, said second direction being different from said first direction;
   said motion vector having a first previous component value in the first direction;
   said method comprising the steps of:
      /a/ defining, by processing circuitry, a first image portion in the first image and a second image portion in the second image based on said first previous component value of the motion vector, wherein the first image portion and the second image portion are a common overlap area of a scene in both the first and second images, and wherein a portion of the first image without the first image portion is composed of pixels that would be sent off of the first image when adjusted in the first direction based on the first previous component value and a portion of the second image without the second image portion is composed of pixels that would be sent off of the second image when adjusted in the first direction based on the first previous component value;
      /b/ determining, by the processing circuitry, a first characteristics vector for the first image in the first image portion and a second characteristics vector for the second image in the second image portion;
      /c/ estimating, by the processing circuitry, a first shift value between said first and second images by comparing said first and second characteristics vectors;
      /d/ obtaining, by the processing circuitry, a second current component value based on said first shift value; and
      /e/ obtaining, by the processing circuitry, a first current component value by
         defining a third image portion in the first image and a fourth image portion in the second image based on the second current component value, wherein a portion of the first image without the third image portion is composed of pixels that would be sent off of the first image when adjusted in the second direction based on the second current component value and a portion of the second image without the fourth image portion is composed of pixels that would be sent off of the second image when adjusted in the second direction based on the second current component value;
         determining a third characteristics vector for the first image in the third image portion and a fourth characteristics vector for the second image in the fourth image portion;
         estimating a second shift value between said first and second images by comparing said third and fourth characteristics vectors; and
         obtaining the first current component value based on said second shift value;
   wherein the motion vector is defined by the first and second current component values.

2. Method of motion estimation according to claim 1, further comprising the following step of:
   /f/ repeating N times steps /a/ to /e/, the first previous component value in repeated step /a/ being the first current component value obtained at the previous execution of step /e/;
   N being an integer greater than or equal to 1.

3. Method of motion estimation according to claim 1, further comprising the following step of:
   /g/ repeating steps /a/ to /e/ while the first current component value and second current component value of the motion vector do not satisfy a criterion, the first previous component value in repeated step /a/ being the first current component value obtained at the previous execution of step /e/.

4. Method for motion estimation according to claim 3, wherein the second current component value of the motion vector at the end of each iteration of steps /a/ to /e/, being considered as second previous component value for the next iteration (j) of steps /a/ to /e/;
   the criterion is satisfied when the absolute value of the difference between the first current component value and the first previous component value is lower than or equal to a first threshold value; and the absolute value of the difference between the second current component value and the second previous component value 1S lower than or equal to a second threshold value.

5. Method of motion estimation according to claim 3, wherein between steps /d/ and /e/, if the motion vector having the second current component value and the first previous component value satisfies the criterion, then the first current component value is the first previous component value and the step /e/ is skipped.

6. Method for motion estimation according to claim 1, wherein, at step /c/, the following steps are performed:
   determining a set of shift value candidates;
   obtaining a set of metrics, by performing the following steps for each shift value candidate:
      selecting a first set of components from components of the first characteristics vector based on said shift value candidate;
      selecting a second set of components from components of the second characteristics vector based on said shift value candidate;
      calculating one metrics between said first and second set of components; and
      determining the first shift value by selecting the shift value candidate which corresponds to an extremum value metrics of said set of metrics;
   wherein, at step /d/, the extremum value metrics is associated to the second current component value.

7. Method for motion estimation according to claim 1, further comprising the following steps for at least a current component value among the first and the second current component values:
   obtaining at least a first and a second corresponding supplementary component values by adding two respective offsets to the corresponding current component value;
   obtaining a set of metrics, by performing the following steps for each corresponding supplementary component value:
      selecting a first set of components from components of the first characteristics vector based on said corresponding supplementary component value;
      selecting a second set of components from components of the second characteristics vector based on said corresponding supplementary component value; and
      calculating one metrics, associated to corresponding supplementary component value, between said first and second set of components;
   obtaining an interpolation curve by interpolating at least three points defined by the first and second corresponding supplementary component values and the corresponding current component value as abscissas, and by their respective associated metrics as respective ordinates; and selecting as said current component value one of said abscissas corresponding to an ordinate which is an extremum value on said interpolation curve.

8. Method for motion estimation according to claim 1, further comprising the following steps:

obtaining at least a first and a second corresponding supplementary component values by adding two respective offsets to the corresponding current component value;

obtaining a set of metrics, by performing the following steps for each corresponding supplementary component value:

selecting a first set of components from components of the first characteristics vector based on said corresponding supplementary component value;

selecting a second set of components from components of the second characteristics vector based on said corresponding supplementary component value;

and calculating one metrics, associated to corresponding supplementary component value, between said first and second set of components;

obtaining an interpolation curve by interpolating at least three points defined by the first and second corresponding supplementary component values and the corresponding current component value as abscissas, and by their respective associated metrics as respective ordinates;

obtaining a determined abscissa, among said abscissas, corresponding to an ordinate which is an extremum value on said interpolation curve;

obtaining an abscissa as said current component value by rounding said determined abscissa to a predetermined fraction of pixel.

9. Circuitry for processing images, adapted to perform a method comprising:

processing, by the processing circuitry, images in an image sequence comprising at least a first image and a second image, a motion vector being associated to said first and second images and being defined in a coordinate system having at least a first direction and a second direction, said second direction being different from said first direction, said motion vector having a first previous component value in the first direction;

/a/ defining, by the processing circuitry, a first image portion in the first image and a second search area in the second image based on said first previous component value of the motion vector, wherein the first image portion and the second image portion are a common overlap area of a scene in both the first and second images, and wherein a portion of the first image without the first image portion is composed of pixels that would be sent off of the first image when adjusted in the first direction based on the first previous component value and a portion of the second image without the second image portion is composed of pixels that would be sent off of the second image when adjusted in the first direction based on the first previous component value;

/b/ determining, by the processing circuitry, a first characteristics vector for the first image in the first image portion and a second characteristics vector for the second image in the second image portion;

/c/ estimating, by the processing circuitry, a first shift value between said first and second images by comparing said first and second characteristics vectors; and /d/ obtaining, by the processing circuitry, a second current component value based on said first shift value; and /e/ obtaining, by the processing circuitry, a first current component value by defining a third image portion in the first image and a fourth image portion in the second image based on the second current component value, wherein a portion of the first image without the third image portion is composed of pixels that would be sent off of the first image when adjusted in the second direction based on the second current component value and a portion of the second image without the fourth image portion is composed of pixels that would be sent off of the second image when adjusted in the second direction based on the second current component value;

determining a third characteristics vector for the first image in the third image portion and a fourth characteristics vector for the second image in the fourth image portion;

estimating a second shift value between said first and second images by comparing said third and fourth characteristics vectors; and obtaining the first current component value based on said second shift value;

wherein the motion vector is defined by the first and second current component values.

10. An electronic device comprising the circuitry of claim 9.

11. The electronic device according to claim 10, being one among a mobile telephone and a digital camera.

12. A computer program product comprising a non-transitory computer readable medium having stored thereon computer program instructions loadable into a computing device and adapted to—when loaded into and executed by said computing device—cause the computing device to perform a method comprising: processing images in an image sequence comprising at least a first image and a second image, a motion vector being associated to said first and second images and being defined in a coordinate system having at least a first direction and a second direction, said second direction being different from said first direction, said motion vector having a first previous component value in the first direction;

/a/ defining a first image portion in the first image and a second search area in the second image based on said first previous component value of the motion vector, wherein the first image portion and the second image portion are a common overlap area of a scene in both the first and second images, and wherein a portion of the first image without the first image portion is composed of pixels that would be sent off of the first image when adjusted in the first direction based on the first previous component value and a portion of the second image without the second image portion is composed of pixels that would be sent off of the second image when adjusted in the first direction based on the first previous component value;

/b/ determining a first characteristics vector for the first image in the first image portion and a second characteristics vector for the second image in the second image portion;

/c/ estimating a first shift value between said first and second images by comparing said first and second characteristics vectors; and /d/ obtaining a second current component value based on said first shift value; and /e/ obtaining a first current component value by defining a third image portion in the first image and a fourth image portion in the second image based on the second current component value, wherein a portion of the first image without the third image portion is composed of pixels that would be sent off of the first image when adjusted in the second direction based on the second current component value and a portion of the second image without the fourth image portion is composed of pixels that would be sent off of the second image when adjusted in the second direction based on the second current component value;

determining a third characteristics vector for the first image in the third image portion and a fourth characteristics vector for the second image in the fourth image portion;

estimating a second shift value between said first and second images by comparing said third and fourth characteristics vectors; and obtaining the first current component value based on said second shift value;

wherein the motion vector is defined by the first and second current component values.

\* \* \* \* \*